United States Patent [19]

Katayama

[11] Patent Number: 4,796,725

[45] Date of Patent: Jan. 10, 1989

[54] ELECTROSTATIC TRANSDUCER

[75] Inventor: Susumu Katayama, Osaka, Japan

[73] Assignee: Matsushita Electric Works, Ltd., Osaka, Japan

[21] Appl. No.: 129,969

[22] Filed: Dec. 4, 1987

Related U.S. Application Data

[63] Continuation of Ser. No. 849,133, Apr. 7, 1986, abandoned, which is a continuation-in-part of Ser. No. 416,657, Sep. 10, 1982, abandoned.

[30] Foreign Application Priority Data

Sep. 14, 1981 [JP] Japan .................................. 56-144902

[51] Int. Cl.$^4$ ............................................. H04R 19/00
[52] U.S. Cl. ..................................... 181/142; 181/165; 181/171; 340/391
[58] Field of Search ....................... 181/142, 165, 171; 340/391

[56] References Cited

U.S. PATENT DOCUMENTS

| 3,190,972 | 6/1965 | Schoeps et al. .................. | 179/111 R |
| 3,908,098 | 9/1975 | Kawakami et al. .............. | 179/111 R |
| 3,958,662 | 5/1976 | Brzezinski et al. .............. | 179/111 R |
| 4,081,626 | 3/1978 | Muggli et al. ..................... | 367/140 |
| 4,085,297 | 4/1978 | Paglia ............................... | 179/111 R |
| 4,321,432 | 3/1982 | Matsutani et al. .............. | 179/111 R |
| 4,418,246 | 11/1983 | Sawyer ........................... | 179/111 E |

FOREIGN PATENT DOCUMENTS

| 1100697 | 3/1961 | Fed. Rep. of Germany ... | 179/111 R |
| 2459729 | 6/1976 | Fed. Rep. of Germany ... | 179/111 R |
| 57-99100 | 6/1982 | Japan ............................... | 179/111 R |
| 58-46800 | 3/1983 | Japan ............................... | 179/111 R |
| NL78026 | 9/1979 | Netherlands .................... | 179/111 R |
| 1234767 | 6/1971 | United Kingdom ............. | 179/111 R |

Primary Examiner—Nelson Moskowitz
Attorney, Agent, or Firm—Koda and Androlia

[57] ABSTRACT

An electrostatic transducer which includes a vibrating membrane provided between a fixed electrode and a movable electrode to which electric signals are applied. The transducer further includes a plurality of depressions provided concentrically with a center of the fixed electrode in a surface of the fixed electrode which is in contact with the vibrating membrane and a plurality of through openings corresponding with the plurality of depressions further provided in the fixed electrode whereby the resonant frequency of the electrostatic transducer is reduced and the conversion efficiency of electric signals to sound pressure is increased.

7 Claims, 5 Drawing Sheets 4,796,725

ELECTROSTATIC TRANSDUCER

This is a continuation of application Ser. No. 849,133, filed Apr. 7, 1986 now abandoned, which is a continuation-in-part of application Ser. No. 416,657, filed Sept. 10, 1982 now abandoned.

BACKGROUND OF THE INVENTION

1. Field of the Invention

The present invention relates to electrostatic transducers and particularly to electrostatic transducers used for ultrasonic sound production and reception.

2. Prior Art

Referring to FIG. 1, shown therein is a general view illustrating an electrostatic transducer of the single type. In FIG. 1 the electrostatic transducer includes a disc type fixed electrode A, a vibrating member B placed on a surface of the fixed electrode A and a disc type movable electrode C provided on the surface of the vibrating membrane B. A power source E is applied between the movable electrode C and the fixed electrode A. The power source E generates, for example, an electric current having voltages of 100 to 200 volts and frequencies of 50 to 60 KHz. When electric signals are applied to the movable electrode C and the fixed electrode A from the power source E, the vibrating membrane B vibrates to generate ultrasonic waves. The directivity of the fixed electrode A and the vibrating membrane B can be approximated by the following equation based upon the directivity theory of circular piston sound sources since they are nearly flat vibrating surfaces:

$$\text{Directivity function } R = \frac{2J_1(Z)}{Z} \quad Z = \frac{\pi d}{\tau} \sin\theta$$

In the above equations, $\lambda$ is the wavelength, d is the diameter of the sound source and angle $\theta$ means an opening angle with respect to the central axis of the transducer. In these equations it is assumed that $\lambda$ equals 8.7 mm and d equals 36 mm to calculate the directivity and the directivity is as shown in FIG. 2. That is, the side lobe is attenuated by only 16 dB. The application of a vibrator having such beam directivity to, for example, an ultrasonic switch leads to the generation of an identification area at a position which is useless as a result of the side lobe. In FIG. 3 is shown a transducer in which the peripheral area D of the vibrating surface is tilted forward (an output of the direction acoustic waves Y) to advance the phases of both sides of the vibrating surface which has been proposed by the inventor in order to eliminate the disadvantage or the large side lobe.

Referring to FIG. 3, the sandwich construction consisting of the fixed electrode 1, the vibrating membrane 2 and the movable electrode 3 is identical with that of the general electrostatic type ultrasonic transducer of the single type shown in FIG. 1; however, the central portion F of the fixed electrode 1 is flat and the periphery D of the fixed electrode 1 is conical. Furthermore, the fixed electrode 1 is provided with a large number of acoustic wave radiation holes 8 all over the surface thereof. The periphery of the vibrating membrane 2 and the movable electrode 3 are fixed between a fixing frame 6 and the end surfaces of the fixing stand 7. The output direction of acoustic waves is indicated by the arrow Y. At this time it should be pointed out that although the side lobe can be attenuated by 30 dB as is shown in FIG. 2 by the broken line, the resonance frequency is 80 KHz or more. The use of an ultrasonic transducer at such a high resonant frequency is undesirable since the attenuation of sound at such a high frequency is large. Suitable frequencies at which such a transducer is used are about 40 to 60 KHz.

SUMMARY OF THE INVENTION

It is a general object of the present invention to provide an electrostatic ultrasonic transducer with a decreased resonant frequency and an increased conversion coefficient between acoustic signals and electric signals.

In keeping with the principles of the present invention, the objects are accomplished by a unique electrostatic transducer in which a vibrating membrane is provided between a fixed and a movable electrode. The electrostatic transducer is further constructed such that a surface of the fixed electrode which is in contact with the vibrating membrane is provided with a plurality of depressions provided concentrically with a center of the fixed electrode and the fixed electrode is further provided with a plurality of through openings corresponding with the plurality of depressions to allow sound to pass there through.

BRIEF DESCRIPTION OF THE DRAWINGS

The above mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
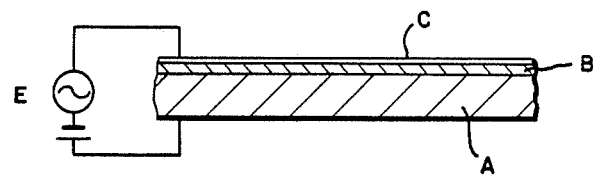
FIG. 1 is a general view illustrating an electrostatic transducer of the prior art.
Figure 2:
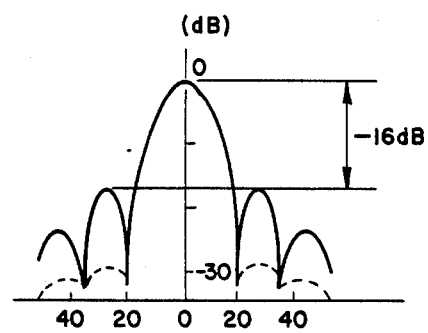
FIG. 2 is a diagram illustrating the radiation characteristics of the electrostatic transducer of FIG. 1.
Figure 3:
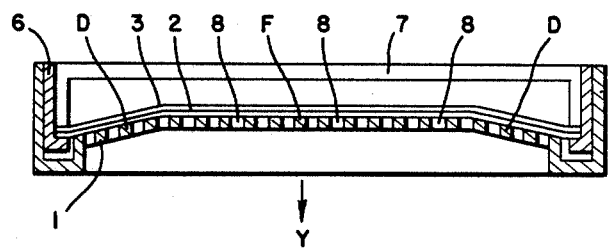
FIG. 3 is a sectional view illustrating another prior art electrostatic transducer.
Figure 4:
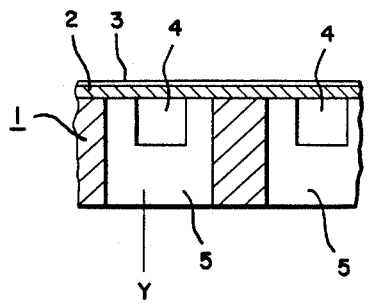
FIG. 4 is an enlarged perspective view illustrating the main parts of a preferred embodiment of an electrostatic transducer in accordance with the teachings of the present invention.
Figure 5:
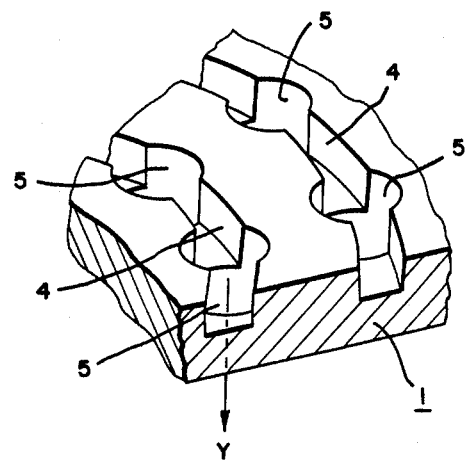
FIG. 5 is an enlarged perspective view illustrating the main parts of the fixed electrode shown in FIG. 4.
Figure 6:
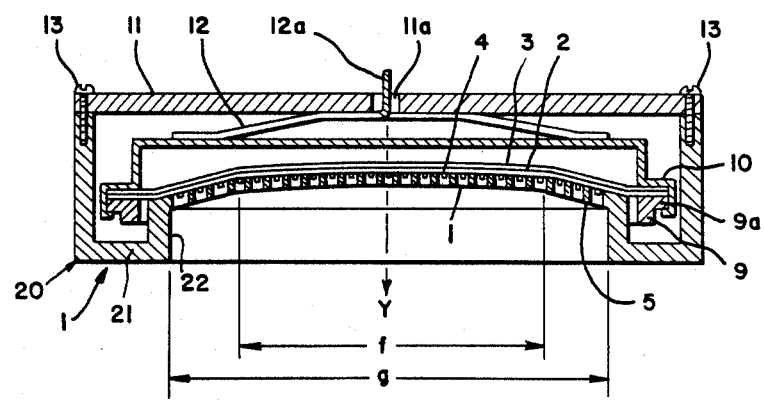
FIG. 6 is a sectional view illustrating the entire construction of an electrostatic transducer in accordance with the teachings of the present invention.
Figure 7:
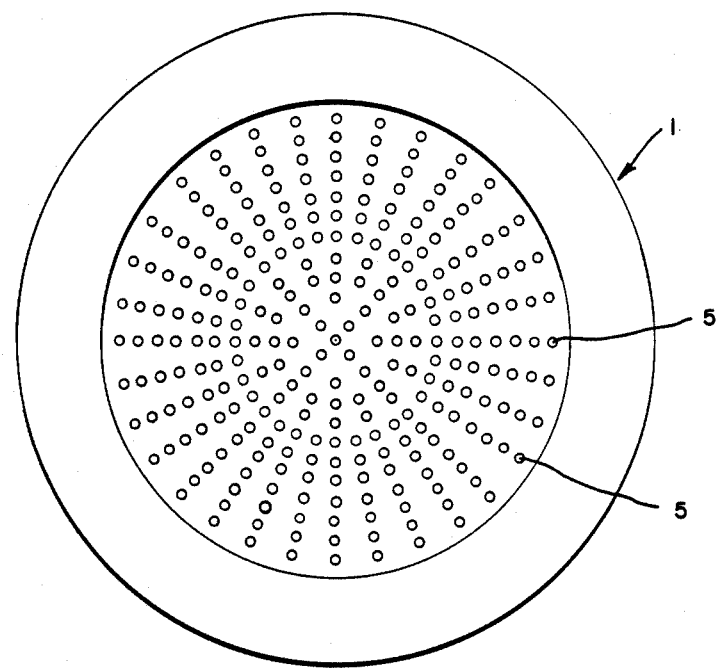
FIG. 7 is a front plan view illustrating the fixed electrode shown in FIG. 5.
Figure 8:
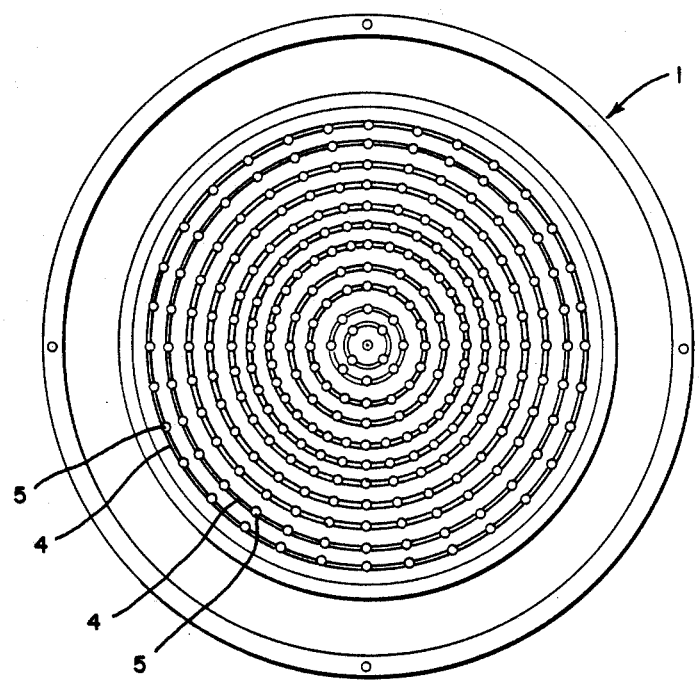
FIG. 8 is back plan view illustrating the fixed electrode of FIG. 5.
Figure 9:
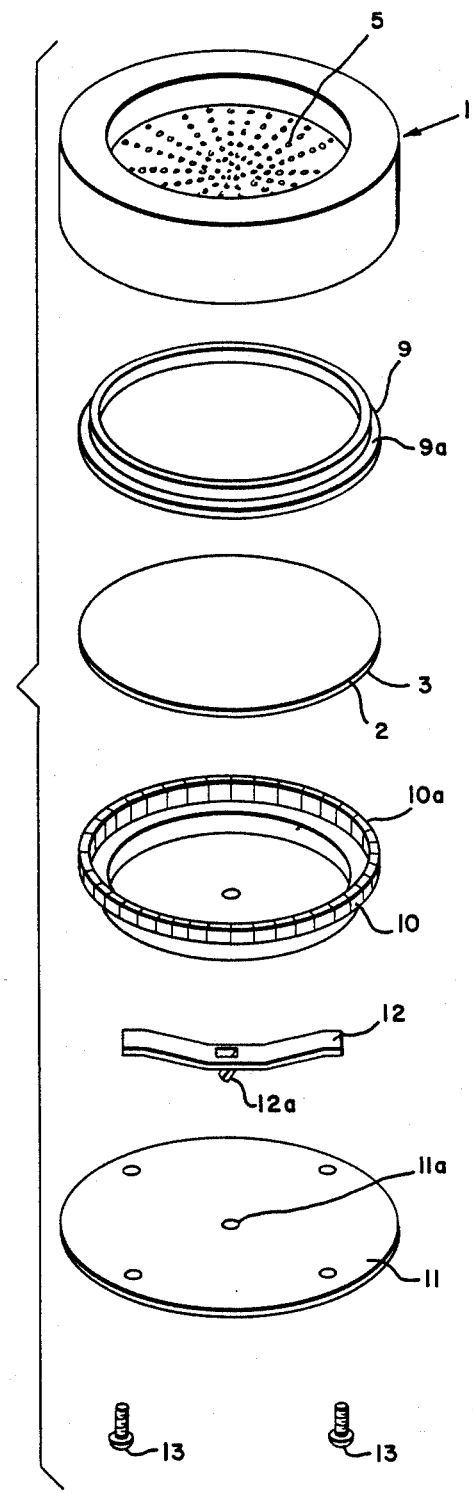
FIG. 9 is a disassembled perspective view illustrating the electrostatic transducer in accordance with the teachings of the present invention.

The preferred embodiment of the present invention will be described in detail by reference to FIGS. 4 through 9 and in particular to FIG. 6. Referring more particularly to the drawings, the electrostatic transducer includes a disc type fixed electrode 1 having a flat central portion and a conical periphery and a vibrating membrane 2 provided between the fixed electrode 1 and a movable electrode 3 in the same manner as in the prior art. A plurality of grooves 4 are concentrically formed on the surface of the fixed electrode 1 which is in contact with the vibrating membrane 2, as is shown in FIG. 8. The grooves 4 have rectangular cross-sections. In addition, holes 5 are formed radially from the center of the fixed electrode 1 at the same positions as the grooves 4 with the holes 5 passing through the fixed electrode 1 and having a width larger than that of the grooves 4.

In a preferred construction the thickness of the fixed electrode 1 is 1 mm, the outside diameter of the fixed electrode is 38 mm, the width of the grooves 4 are from 0.2 to 0.5 mm, the depth of the grooves 4 are between 0.3 to 0.5 mm and the diameter of the holes 5 are 1 mm.

The vibrating membrane 2 is made of a plastic film such as polyester resins and the like. The movable electrode 3 is formed by vaporizing a metallic material onto the surface of the vibrating membrane 2. A suitable metallic material would be aluminum. The vibrating membrane 2 is further fixed between a fixing spacer 9 made of an insulating material such as plastic and the end internal surface of a dished fixture 10 made of a conductive material such as aluminum at the peripheral portion thereof. The fixing spacer 9 and the fixture 10 are fixed together by the tightening action of the end comb portion 10a of the fixture 10 to the peripheral rim portion 9a of the fixing spacer 9. The vibrating membrane 2 is pressed against the fixed electrode 1 by the spring force of a compression flat spring 12 provided between the back cover 11 which closes the open side of the fixed electrode 1 and the fixture 10.

The vibrating membrane 2 is held with some slack between the fixing spacer 9 and the fixture 10 before assembly thereof. After assembly the vibrating membrane 2 adheres to the whole surface of the fixed electrode 1. The compression flat spring 12 is made of a conductive material and provided with a bent-up portion 12a at a portion thereof. The bent-up portion 12a protrudes outwardly through an opening 11a formed in the center of the back cover 11. In addition, a fixing screw 13 fixes the back cover 11 to the fixed electrode 1. The fixing screw 13 is connected by an outside terminal (not shown) and serves as the element for feeding the signal to the fixed electrode 1. In addition, the signal is fed to the movable electrode 3 through the bent-up portion 12a of the compression flat spring 12 through the fixture 10 and the bent-up portion 12a is also connected to an outside terminal (not shown).

The application of electric signals between the movable electrode 3 and the fixed electrode 1 causes the vibrating membrane 2 to vibrate on the grooves 4 on the fixed electrode 1. The resulting vibration is propagated in a direction opposite to said vibrating membrane 2 (the Y direction) through the holes 5 formed at the same positions as the grooves 4 and sound pressure is created by the transducer.

Figure 10:
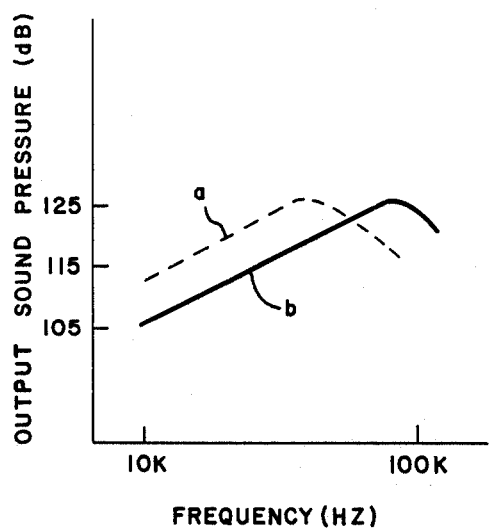
FIG. 10 is a diagram illustrating the relationship between frequency and output sound pressure for electrostatic transducers with a fixed electrode having depressions thereon and a fixed electrode without depressions thereon.

In FIG. 10 is shown the characteristic curve between the frequencies and output sound pressures for the cases when the fixed electrode 1 is provided with grooves 4 (curve A) and for the case when the fixed electrode 1 is not provided with the grooves 4 (curve B). It is found from the curves that the resonant frequency of the transducer is decreased by the grooves 4.

Figure 11:
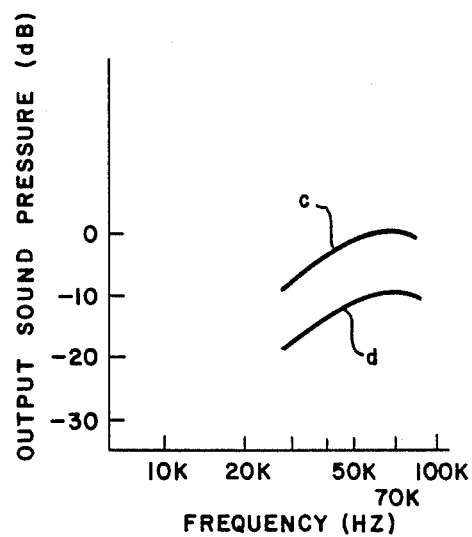
FIG. 11 is a diagram illustrating the dependence upon the positional relationship between the grooves and the holes as a function of frequency and sound pressure.

Shown in FIG. 11 are the characteristic curves showing the relationship between the position of the grooves 4 and the position of the holes 5 which are formed in the fixed electrode 1. In FIG. 11 the frequency is plotted on the abscissa while the sound pressure is expressed on the ordinate. The curve C shows the case wherein the holes 5 are formed at the same position as the grooves 4 while the curve D shows the case where the holes 5 are linearly arranged and the grooves 4 are concentrically arranged with the holes 5 partially overlapping the grooves 4. As can be seen from the curves the resonant frequency is decreased by forming the grooves 4 while the coefficient conversion can be increased by forming the holes 5 at the same position as the grooves 4.

As to the results of the characteristics shown in FIGS. 10 and 11, it is the inventor's opinion that portions of the vibrating membrane 2 which face the openings provided by the grooves 4 become free and the portions of the vibrating membrane 2 corresponding to the openings of the grooves 4 vibrate at lower resonant frequencies with their peripheries supported by the edges of the openings of the grooves 4. Furthermore, since the holes 5 are formed at the same position as the grooves 4, vibrations generated in the portions of the vibrating membrane 2 over the grooves 4 at the desired resonant frequency are converted to sound pressure most effectively. This means that it is possible to increase the sound in the sound area of the desired resonance frequency.

The characteristic curves of FIGS. 10 and 11 were obtained from certain experiments. The experimental conditions were as follows:

the diameter of the effective area for generating acoustic waves of the fixed electrode f equals 36 mm;

the diameter of the central portion of the fixed electrode g equals 25 mm;

the angle $\theta$ equals 12 degrees;

the throat area ratio in the effective area of generating acoustic waves equals 29 percent;

the diameter of the holes 5 equals 1.0 mm;

the voltage applied between the fixed and movable electrodes equals 100 V AC, 141 V DC; and the distance from a measuring microphone to a vibrator equals 30 cm.

Although a fixed electrode provided with grooves on the surface thereof facing the vibrating membrane for setting the resonance frequency to a suitable value is described above as the preferred embodiment, it would be possible to utilize other depressions or dents formed in the front of the fixed electrode facing the vibrating membrane. Such depressions or dents could be circular or rectangular or slits passing through the fixed electrode. Any of these configurations could be utilized instead of the grooves 4. In short, it is a general principle of the present invention that spaces should be formed in front of the vibrating membrane in order to achieve the result of the present invention and the manner of forming the spaces is not determinative of the present invention.

Furthermore, although the grooves are arranged concentrically in the preferred embodiments of the present invention, any arrangement of the grooves 4 in which they are symmetrically arranged with the center of the fixed electrode 3 as the point of symmetry gives no change in the desired characteristics.

As described above according to the present invention a large number of depressions provided in the surface of the fixed electrode 1 facing the vibrating membrane 2 decreases the resonance frequency of the transducer when compared with the transducer without grooves. In addition, a plurality of holes 5 formed at the same position in the fixed electrode 1 as the depressions, as shown by FIG. 11, increases the output sound pressure by about 10 dB when compared with the case wherein the holes 5 are not formed at the same position as the depressions. Therefore, by the construction of the present invention the conversion coefficient can be increased while reducing the resonance frequency of the transducer.

Figure 12:
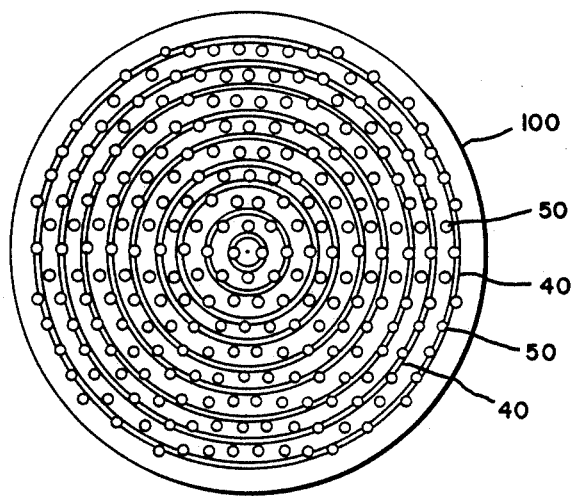
FIG. 12 is a plan view illustrating the shape of another fixed electrode for use in comparative experiments.

Shown in FIG. 12 is a front plan view showing the shape and construction of the surface of a fixed electrode which contacts the vibrating membrane which is used in comparative experiments. In the FIG. 12, the fixed electrode 100 includes grooves 40 and holes 50.

It should be apparent to those skilled in that art that the above described embodiments are merely illustrative of but a few of the many possible specific embodiments of the present invention. Numerous and varied other arrangements can be readily devised by those skilled in the art without departing from the spirit and the scope of the invention.

I claim:

1. An electrostatic transducer comprising:
   a casing having with a front opening and a rear opening;
   a fixed electrode extending across the front opening;
   a vibration membrane extending over the fixed electrode in surface contact therewith;
   a movable electrode extending over the vibration membrane in surface contact therewith for causing the vibration membrane to vibrate when an electric signal is applied between said fixed electrode and the movable electrode and for producing an electric signal in relation to said fixed electrode in response to the vibrating membrane being vibrated; and
   a back cover closing said rear opening to enclose said vibration membrane and said movable electrode between the fixed electrode and the back cover;
   and further characterized in that:
   said fixed electrode is exposed on its surface opposite to the movable electrode to define thereat a sound emitting and receiving surface and is concavely shaped with respect to said exposed surface;
   said fixed electrode terminates at its periphery at an inner periphery of said front opening of said casing and is provide in its inner surface opposite to the exposed surface with a plurality of depressions which are arranged concentrically with a center of the fixed electrode; and
   said fixed electrode is further provided with a plurality of through openings corresponding only to the plurality of depressions to allow sound to pass through the fixed electrode to and from the vibration membrane.

2. An electrostatic transducer according to claim 1, wherein said casing has a front wall with said front opening, said front wall including an inward extension which extends inwardly from the inner periphery of said front opening and terminates at its rear end into the periphery of said fixed electrode so that the fixed electrode is recessed with respect to the front wall of said casing.

3. An electrode static transducer according to claim 2, wherein said fixed electrode is integrally formed with said casing to be continuous at its entire periphery with the front wall of the casing through an inward extension.

4. An electrostatic transducer according to claim 1, wherein said plurality of depressions comprises a plurality of concentric grooves which are provided in the inner surface of said fixed electrode and which have a width less than a diameter of said through openings.

5. An electrostatic transducer according to claim 1 or 3, wherein said electrostatic transducer further comprises a conductive dish fixture mounted within the casing to be in electrical connection with said movable electrode and to fix said movable electrode, vibration membrane and fixed electrode together at the respective peripheries thereof; and
   a compression spring provided between said back cover and said disk fixture to urge said dish fixture in a direction of applying a tension force to the vibration membrane for keeping a constant surface contact of said vibration membrane with said fixed electrode, said compression spring being in electrical connection to said movable electrode through said dish fixture and having a terminal pin projecting rearwardly through the back cover.

6. An electrostatic transducer according to claim 1, wherein said fixed electrode is continuously curved in cross-section.

7. An electrostatic transducer according to claim 1, wherein said fixed electrode is spherical in cross-section.

* * * * *